US012752716B2

(12) United States Patent
Wesch

(10) Patent No.: US 12,752,716 B2
(45) Date of Patent: Oct. 6, 2026

(54) PIVOTABLE MODULE UNIT, PIVOTABLE SENSOR SYSTEM, AND TRANSPORTATION VEHICLE

(71) Applicant: VOLKSWAGEN AKTIENGESELLSCHAFT, Wolfsburg (DE)

(72) Inventor: Thomas Wesch, Osloß (DE)

(73) Assignee: VOLKSWAGEN AKTIENGESELLSCHAFT (DE)

(*) Notice: Subject to any disclaimer, the term of this patent is extended or adjusted under 35 U.S.C. 154(b) by 285 days.

(21) Appl. No.: 18/652,865

(22) Filed: May 2, 2024

(65) Prior Publication Data

US 2024/0367591 A1 Nov. 7, 2024

(30) Foreign Application Priority Data

May 2, 2023 (DE) ..................... 10 2023 204 048.4

(51) Int. Cl.

| | |
|---|---|
| ***B60R 11/04*** | (2006.01) |
| ***B60R 11/00*** | (2006.01) |
| ***G01D 11/24*** | (2006.01) |
| ***G01D 11/30*** | (2006.01) |

(52) U.S. Cl.

CPC ............ *B60R 11/00* (2013.01); *G01D 11/245* (2013.01); *G01D 11/30* (2013.01); *B60R 2011/008* (2013.01)

(58) Field of Classification Search

CPC ... B60R 11/00; B60R 2011/008; B60R 11/04; B60R 19/483; B60R 2011/004; B60R 2011/005; B60R 2300/00; B60R 2011/0087; B60R 21/0134; G01D 11/245; G01D 11/30

USPC ......... 73/431, 596, 597, 620, 621, 624–629, 73/632, 649, 493, 866.5; 374/142, 208; 348/135, 148, 149, 373; 248/682, 685, 248/637, 659, 664, 668, 671

See application file for complete search history.

(56) References Cited

U.S. PATENT DOCUMENTS

| | | | | |
|---|---|---|---|---|
| 8,961,044 | B2 | 2/2015 | Barthel | |
| 10,214,156 | B2 | 2/2019 | Moenig et al. | |
| 10,249,941 | B2 | 4/2019 | Lopez, Jr. et al. | |
| 11,292,410 | B2 | 4/2022 | Keysberg | |
| 2023/0084105 | A1 | 3/2023 | Briest | |
| 2023/0382315 | A1* | 11/2023 | Hinricher | B60R 11/04 |

FOREIGN PATENT DOCUMENTS

| | | | |
|---|---|---|---|
| AU | 2015202244 | A1 | 9/2016 |
| DE | 202015101259 | U1 | 3/2015 |
| DE | 102015117777 | A1 | 11/2016 |

(Continued)

*Primary Examiner* — Robert R Raevis

(74) *Attorney, Agent, or Firm* — BARNES & THORNBURG LLP

(57) ABSTRACT

A pivotable module unit for sensors for a transportation vehicle having at least two attachment elements spaced apart from each other, a sensor holding unit arranged between the two attachment elements, and two pivoting units. The sensor holding unit holds at least one sensor for a transportation vehicle. The two pivoting units fasten the sensor holding unit to the two attachment elements so the sensor holding unit is movable about a first pivot axis and about a second pivot axis which is different from the first pivot axis.

16 Claims, 4 Drawing Sheets

(56) References Cited

FOREIGN PATENT DOCUMENTS

| | | | | | |
|---|---|---|---|---|---|
| DE | 102018108988 | A1 | | 10/2018 | |
| DE | 102017009055 | A1 | | 3/2019 | |
| DE | 102018212539 | A1 | | 1/2020 | |
| DE | 102020201712 | A1 | | 8/2021 | |
| EP | 2640607 | A1 | | 9/2013 | |
| KR | 102492614 | B1 | * | 1/2023 | ............. B60R 11/04 |
| WO | WO-2022263129 | A1 | * | 12/2022 | ............. G01S 7/027 |

* cited by examiner

PIVOTABLE MODULE UNIT, PIVOTABLE SENSOR SYSTEM, AND TRANSPORTATION VEHICLE

PRIORITY CLAIM

This patent application claims priority to German Patent Application No. 10 2023 204 048.4, filed 2 May 2023, the disclosure of which is incorporated herein by reference in its entirety.

SUMMARY

Illustrative embodiments relate generally to the field of sensor holding devices for transportation vehicles. Specifically, the illustrative embodiments relate to a pivotable module unit for sensors for a transportation vehicle, a pivotable sensor system with such a pivotable module unit, and a transportation vehicle.

BRIEF DESCRIPTION OF THE DRAWINGS

Exemplary embodiments are described below with reference to the figures, in which.

DETAILED DESCRIPTION

Figure 1:
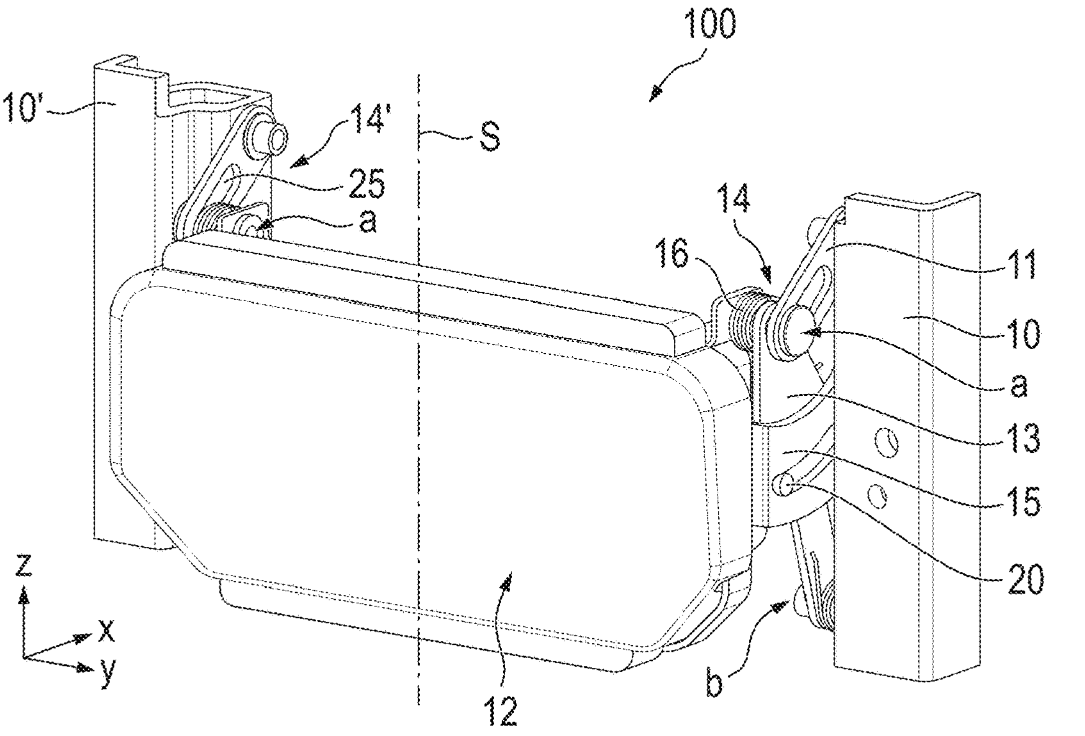
FIG. 1 schematically shows a perspective view of a disclosed pivotable module unit according to an exemplary embodiment.

In transportation vehicles, sensors or radars which are arranged on the periphery of the transportation vehicle are increasingly provided. Such sensors or radars are able to supply valuable data for assisting a control system of the transportation vehicle. Specifically, a control device of the transportation vehicle can to some extent be controlled on the basis of such data. This is the case, for example, in a driver assistance system. Alternatively or additionally, such data is provided to the driver, so that the driver can adapt or improve their driving behavior. This is the case, for example, in a parking assistance device. Such sensors can accordingly be used to increase the safety and/or the convenience of vehicle occupants.

To be able to provide this valuable data, such sensors or radars are usually located around the periphery of the transportation vehicle and can, therefore, be highly exposed. Damage to the sensors could jeopardize the safety and/or comfort of vehicle occupants. However, it is not unusual for an object to strike the body of the transportation vehicle, for example, when parking, maneuvering or driving on a country road. Because of the necessary positioning of the sensors or radars around the periphery of the transportation vehicle, the sensors or radars can primarily be affected by such shocks. In minor crash situations, most of the sensors or radars are error-prone and can be damaged very quickly.

Disclosed embodiments at least partly eliminate the above-described drawbacks. In particular, disclosed embodiments provide a pivotable module unit for sensors for a transportation vehicle which reduces the susceptibility of the sensors to damage.

The above is achieved by a pivotable module unit, by a pivotable sensor system, and by a transportation vehicle. Further features and details can be gathered from the subclaims, the description and the drawings. Here, features and details which are described in connection with the disclosed pivotable module unit also apply in connection with the disclosed transportation vehicle, the disclosed pivotable sensor system, and vice versa in each case, so that, with respect to the disclosure, reference is or can always be made reciprocally to the individual features of the disclosure.

By using the exemplary embodiments, an improved pivotable module unit for sensors for a transportation vehicle can be provided. By using such a pivotable module unit, the susceptibility to damage of sensors for a transportation vehicle can be reduced.

A first exemplary embodiment relates to a pivotable module unit for sensors for a transportation vehicle. The pivotable module unit has at least two attachment elements, which are spaced apart from each other, a sensor holding unit arranged between the two attachment elements, and two pivoting units. The sensor holding unit is configured to hold least one sensor for a transportation vehicle. The two pivoting units are configured to fasten the sensor holding unit to the two attachment elements such that it is movable about a first pivot axis and about a second pivot axis which is different from the pivot axis.

In other words, a pivotable module unit is provided which permits a movement of the sensor holding unit, in which one or more sensors can be located, about two different pivot axes. As a result of such a movement, an increased degree of freedom of the sensor holding unit can be achieved. In this way, the module unit can in turn absorb and dampen an impact by a movement. As a result, the entire pivotable module unit can be less susceptible to faults or damage. Sensors or a sensor can be arranged in or on the sensor holding unit.

The sensor holding unit can be designed to absorb an impact and to transmit the absorbed impact to the two pivoting units. The two pivoting units can be designed to dampen the impact. This can be achieved by the fact that the two pivoting units permit a movement of the sensor holding unit about two different pivot axes.

The pivotable module unit can be configured to be attached or fastened to the body of the transportation vehicle. The pivotable module unit can, for example, be attached to the vehicle front or to the vehicle rear. The pivotable module unit can stand out freely at the edge of the transportation vehicle. It is therefore conceivable that the pivotable module unit is arranged flush with an outer part of the transportation vehicle. Alternatively, the pivotable module unit can be partly hidden, for example, behind a grid-like vehicle part. The pivotable module unit can be arranged in a receptacle in a protective strip of the transportation vehicle or in a fender or behind a receptacle of a protective strip of the transportation vehicle or of a fender. The pivotable module unit and, in particular, the sensor holding unit can be arranged flush with the protective strip or the fender. As a result, the pivotable module unit cannot impair the esthetics of the transportation vehicle.

The attachment elements can each be configured to be fastened to a vehicle component. The attachment elements can be a crossmember, a load-bearing structure or a supporting structure. The attachment elements can have a longitudinal extent. The longitudinal extent of the attachment elements can define the height of the pivotable module unit. The two attachment elements can be spaced substantially apart from each other. Each of the two attachment elements may have one or more fastening devices or fastening holes, which can be configured to fasten one of the two pivoting units to the corresponding attachment element. The two attachment elements can be designated as a first attachment element and second attachment element. One of the two attachment elements can be designated as the left-hand attachment element, referred to the sensor holding unit from a front view of the module unit, and one of the two attachment elements can be designated as the right-hand attachment element, referred to the sensor holding unit from a front view of the module unit.

The two pivoting units can be a pivoting mechanism, in particular, a multi-part pivoting mechanism. The two pivoting units may each be arranged on a lateral side of the sensor holding unit, i.e., on the left and right from a front view of the module unit. The two pivoting units can therefore be designed mirror-symmetrically in the plane between the two attachment elements. The axis of symmetry can be aligned substantially parallel to the longitudinal extent of the attachment elements. Via the two pivoting units, the sensor holding unit can be movably fastened to the two attachment elements at the side of the sensor holding unit. The two pivoting units may be designed in such a way that they permit a movement of the sensor holding unit about two different pivot axes. The movement of the sensor holding unit can take place simultaneously about both pivot axes or separately about one of the two pivot axes. Such a movement, be it about one or about both of the two different pivot axes, can be triggered as a result of the fact that an impact is or has been exerted against the sensor holding unit, in particular, against the front side of the sensor holding unit. In other words, the sensor holding unit can be fastened to the two attachment elements so as to be movable in reaction to an impact which may be greater than a minimum movement force.

The movement about the two pivot axes of the sensor holding unit can depend on the impact location, i.e., the point(s) at which an impact is or has been exerted. The two pivoting units can be used to dampen an impact in that, in reaction to an impact, the two pivoting units are able to convert the impact at least partly into a movement of the sensor holding unit. In addition, the two pivoting units can act at least partly as damping elements. For this purpose, the two pivoting units can each have a damper.

The two pivoting units can permit a movement of the sensor holding unit with at least two degrees of freedom. Since the sensor holding unit is fastened to the two attachment elements so as to be movable about two different pivot axes, a greater freedom of movement of the sensor holding unit can be achieved. As a result, the susceptibility to damage of the pivotable module unit and particular of the possible sensors located in the sensor holding unit can be reduced.

It should be noted that the movement of the sensor holding unit can be carried out reversibly. In other words, the sensor holding unit can assume a rest position again after it has moved, for example, because of an impact.

Such a pivotable module unit can protect sensors for a transportation vehicle against damage, for example, because of impacts. By using such a pivotable module unit, sensors for a transportation vehicle can be operated more safely. Because the pivotable module unit can protect sensors for a transportation vehicle better or make them less susceptible to faults or damage, the frequency of a sensor change can be reduced.

According to at least one disclosed embodiment of the pivotable module unit, at least one of the two pivoting units is spring-loaded. One or more springs per pivoting unit can be provided for this purpose. As a result, a movement of the sensor holding unit about the first pivot axis and/or about the second people axis can be carried out. By using spring-loaded pivoting units, forces which, for example, are absorbed by the sensor holding unit can be dampened or cushioned better.

In at least one disclosed embodiment of the pivotable module unit, two latching units are provided, which are each fastened to a pivoting unit. The latching units are configured to fasten the two pivoting units releasably to the corresponding attachment element in a first latching position. Alternatively or additionally, the latching units are configured to fasten the sensor holding unit at least partly releasably to the pivoting units in a second latching position.

In other words, a latching unit per side of the sensor holding unit, i.e., per pivoting unit, can be provided, which can be used to hold the sensor holding unit in an undisturbed position, optionally to hold it stably. The term stably can be defined by a minimum impact. If an impact which is smaller than a minimum impact is exerted directly or indirectly on the sensor holding unit, the sensor holding unit can be fastened stably to the two attachment elements, i.e., the sensor holding element optionally does not move, thanks to the two latching units.

It is not only the level of the impact that can prove to be relevant. The point(s) at which an impact is exerted on the sensor holding unit (directly or indirectly on the sensor holding unit) can likewise have an influence on the latching units. The latching units can be configured to at least partly restrict a movement of the sensor holding unit about the first pivot axis. In the first latching position, for example, a movement of the sensor holding unit about the second pivot axis can be at least partly restricted. In the second latching position, for example, a movement of the sensor holding unit about the first pivot axis can be at least partly restricted. If the two pivoting units are located both in the first and in the second latching position, then it is possible to speak of an undisturbed position or of a rest position of the sensor holding unit. A minimum impact can be set by the two latching units.

As a result, safer and more reliable operation of one or more sensors for a transportation vehicle can be made possible. This is because sensors or radars which can be accommodated in the sensor holding unit can thus be protected against vibrations or movements as a result of wind loading.

According to at least one disclosed embodiment of the pivotable module unit, the two pivoting units each have a pivoting lever and a guide lever. The guide lever has a guide receptacle, via which the pivoting lever is operatively connected to the guide lever. The sensor holding unit is pivotable about the first pivot axis by the respective pivoting lever and movable about the second pivot axis by the respective pivoting lever and the guide lever.

In other words, two levers operatively connected to each other can be provided for each of the two pivoting units. The first pivot axis can be defined via the pivoting lever. The second pivot axis can be defined via a fastening point of the pivoting lever to the attachment element. The second pivot axis can permit a movement of the two pivoting levers, and thus the sensor holding unit, relative to the longitudinal extent of the two attachment elements. The first pivot axis can permit a movement of the sensor holding unit relative to the two pivoting levers. Accordingly, the second pivot axis optionally corresponds to the fastening locations or the fastening points of the pivoting levers to the attachment elements, the pivoting levers being pivotably fastened to the attachment elements. Sprung pivoting about the second pivot axis can be implemented by the fastening points of the pivoting levers to the attachment elements each being provided with a spring. To permit pivoting about the second pivot axis, the guide lever can be optional. The respective guide levers may be designed in such a way that pivoting about the second axis necessarily causes pivoting of the guide levers. The pivoting of the guide lever can therefore correlate with pivoting about the second pivot axis. In other words, the second axis can also be (co-)defined by the guide levers.

The respective guide levers can limit or specify a maximum movement in the depth, i.e., the direction of the interior of the transportation vehicle, or vice versa. By using the guide lever, two stops or a maximum positive pivot angle and a maximum negative pivot angle can be predefined. The two guide levers can define or specify a pivoting range about the second axis.

According to at least one disclosed embodiment of the pivotable module unit, the first pivot axis is movable about the second pivot axis. Alternatively or additionally, the sensor holding unit, together with the first pivot axis, is translationally and/or pivotably movable about the second pivot axis.

The guide lever and/or the pivoting lever can permit pivoting about the second pivot axis. The pivoting lever can permit pivoting about the first pivot axis. The guide lever and the pivoting lever together can permit a translational movement of the sensor holding unit.

According to at least one disclosed embodiment of the pivotable module unit, the sensor holding unit has two guide elements. The two pivoting units, in particular, each pivoting lever of the two pivoting units, each have a main guide receptacle. The two guide elements are arranged in such a way that each of the two guide elements extends at least partly into the main guide receptacle, so that pivoting of the sensor holding unit about the first pivot axis can be guided.

The guide elements can extend sideways, i.e., toward the respective attachment element. The guide elements can be pin-like elements. The two guide elements can be arranged on a pivoting frame of the sensor holding unit. The main guide receptacle can be an opening in the pivoting lever. The main guide receptacle can depict an arc about the first pivot axis. As a result, as the guide elements are guided along the main guide receptacle, the guide elements and, in particular, the sensor holding unit can be pivoted about the first pivot axis.

According to at least one disclosed embodiment of the pivotable module unit, the sensor holding unit has a covering, which is substantially flat. In principle, the sensor holding unit can be formed from many parts. The sensor holding unit can have a covering as a cover which is designed to absorb an impact. The sensors may be protected by the covering or covered by the covering. As a result of a flat covering, the impact can be absorbed as uniformly as possible. As a result, improved and secure transmission of any impact to the pivoting units can be achieved. As a result, in turn improved and more reliable functioning of the pivotable module unit can be achieved.

In other words, the covering can be exposed directly to an impact and can form the most external element of the pivotable module unit. The covering can form a sensor chamber or form an open sensor chamber, in which one or more sensors can be accommodated by the sensor holding unit. The covering of the sensor holding unit can be coupled to a connecting frame of the sensor holding unit. It is conceivable that the covering of the sensor holding unit is releasably coupled to part of the sensor holding unit, so that, if necessary, the covering can be removed. This may prove to be beneficial if, for example, sensors have to be changed.

It is conceivable to form the covering to be transparent or transparent to ultrasound. In particular, the covering is intended to be formed in such a way that the functioning of the sensors located behind the covering is not impaired by the covering.

According to at least one disclosed embodiment of the pivotable module unit, the sensor holding unit has at least two fastening interfaces, which are configured to fasten the sender holding unit movably to the pivoting units, in particular, to the respective pivoting levers. The two fastening interfaces are additionally configured to accommodate a respective first spring.

In other words, the sensor holding unit can have a fastening location on each side, which are used to fasten the sensor holding unit to the respective pivoting unit. The fastening interfaces can be integral with an element, for example, with a pivoting frame, of the sensor holding unit. The fastening interfaces can be cylindrical. The fastening interfaces may each extend through the respective guide receptacle of the guide levers. A movement of the guide levers and/or of the pivoting levers can be at least partly transmitted to the sensor holding unit by the fastening interfaces.

The fastening interfaces may each be arranged on an upper edge of the sensor holding unit, the term upper indicating the direction toward the transportation vehicle roof, starting from the transportation vehicle wheels.

A second exemplary embodiment relates to a pivotable sensor system. The pivotable sensor system has a pivotable module unit as described above and below and at least one sensor.

The at least one sensor can be an ultrasonic sensor, a temperature sensor, a radar sensor, a lidar sensor, an infrared sensor and/or a camera system.

All the benefits which have been explained with reference to the pivotable module unit according to the first exemplary embodiment apply equally to the pivotable sensor system according to the second exemplary embodiment.

A third exemplary embodiment relates to a transportation vehicle having at least one pivotable sensor system as described above and below.

All the benefits which have been explained with reference to the pivotable module unit according to the first exemplary embodiment and/or with reference to the pivotable sensor system apply equally to the transportation vehicle according to the third exemplary embodiment.

According to at least one disclosed embodiment of the transportation vehicle, the sensor holding unit of the pivotable module unit of the pivotable sensor system is displaceable toward the vehicle interior by up to 70 mm, in particular, up to 80 mm, in particular, displaceable substantially in parallel.

As a result, the existing installation space can be used.

All disclosures which are described above and below with reference to an exemplary embodiment of the present disclosure apply equally to all further exemplary embodiments.

Similar, similarly acting, identical or identically acting elements are provided with similar or identical designations in the figures. The figures are merely schematic and not true to scale.

FIG. 1 shows, schematically, a perspective view of a pivotable module unit 100 according to an exemplary embodiment. FIG. 1 shows a front view of a pivotable module unit 100. The pivotable module unit 100 is designed to attach or receive one or more sensors on the transportation vehicle. The pivotable module unit 100 has at least two attachment elements 10, which are spaced apart from each other and extend in the Z direction (cf. the coordinate system in FIG. 1). The two attachment elements 10 can be part of a front module of the transportation vehicle or part of a rear module of a transportation vehicle. The entire pivotable module unit 100 can be fastened to a transportation vehicle front module or to a transportation vehicle rear module via the two attachment elements 10. Arranged between the two attachment elements 10 is a sensor holding unit 12 which is predominantly parallelepiped-shaped. The pivotable module unit 100 also has two pivoting units 14. The sensor holding unit 12 is fastened to the two attachment elements 10 by the two pivoting units 14 such that it can move about a pivot axis a and about a second pivot axis b. The sensor holding unit 12 can therefore be pivotably and also translationally fastened to the attachment elements 10. Each of the two pivoting units 14 may be fastened to the respective attachment element 10 at two fastening locations or fastening points.

It should be noted that in the two attachment elements 10 and in the two pivoting units 14, it is possible to speak respectively of a left-hand attachment element 10 and a right-hand attachment element 10 and of a left-hand pivoting unit 14 and of a right-hand pivoting unit 14. A left-right designation is always based on a front view according to FIG. 1. The pivotable module unit 100 can in principle be formed symmetrically, the axis of symmetry S extending in the Z direction, centrally between the two attachment elements 10.

The two pivoting units 14 may be spring-loaded. For this purpose, in each case two springs 16, 18 can be provided per pivoting unit 14. To avoid the sensor holding unit 12 moving unintentionally during undisturbed operation, i.e., when no impact F is exerted on the sensor holding unit 12, for example, because of unevenness on the road when the transportation vehicle is driven, it is beneficial to provide a latching unit 15 for each pivoting unit 14. Two latching units 15, which are each fastened to a pivoting unit 14, can therefore be provided. Only one of the two latching units 15, namely the right-hand latching unit 15, is visible in FIG. 1. The latching units 15 are configured to fasten the two pivoting units 14 releasably in a first latching position. Alternatively or additionally, the two latching units 15 are configured to fasten the sensor holding unit 12 at least partly releasably to the pivoting units 14 in a second latching position. In FIG. 1, the latching units 15 are located both in the first latching position and in the second latching position; this will be explained further in detail with reference to FIG. 2.

In the first latching position and in the second latching position, the sensor holding unit 12 is located in a rest position or in an undisturbed position. In such a position, the sensor holding unit 12 may be offset in the X direction relative to the attachment elements 10. In the rest position, the sensor holding unit 12 generally projects in the X direction out of the plane formed by the two attachment elements 10.

By using a pivotable module unit 100, a maximum of free space, in which there are no interfering components, can be produced in the area behind the sensors. The total width (in the Y direction) and height (in the Z direction) of the pivotable module unit 100 therefore always has to be adapted to the necessary installation space.

Figure 2:
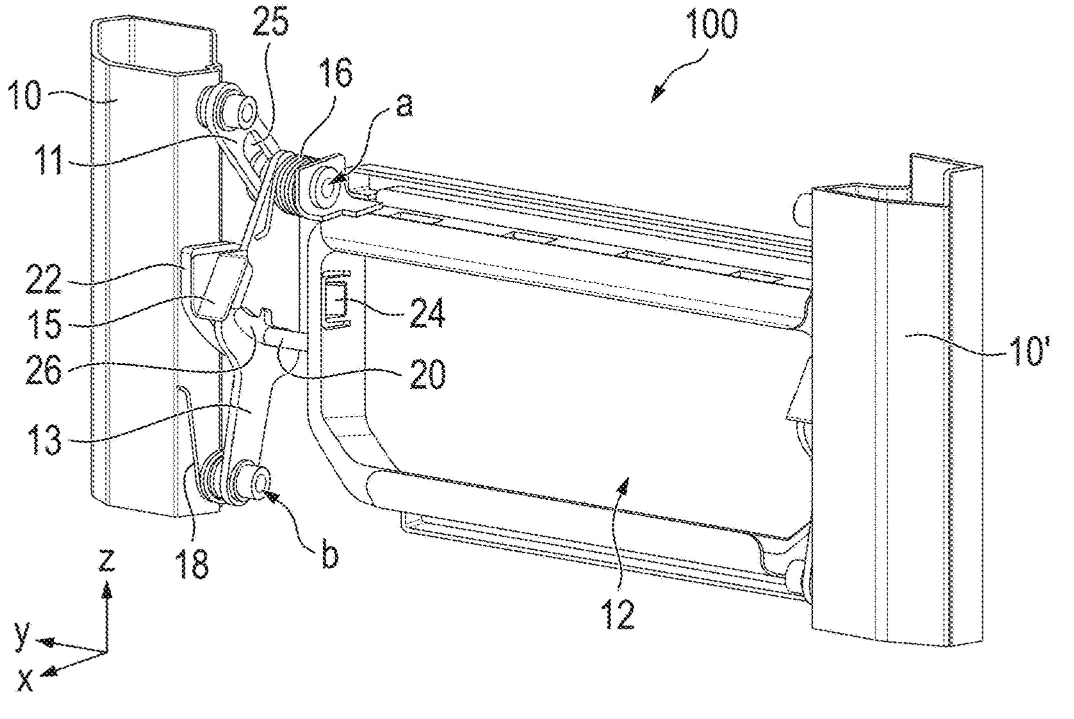
FIG. 2 schematically shows a perspective view of a disclosed pivotable module unit according to an exemplary embodiment.

FIG. 2 shows, schematically, a perspective view of a pivotable module unit 100 according to an exemplary embodiment. FIG. 2 shows a rear view of the pivotable module unit 100 of FIG. 1. If not otherwise described, the pivotable module unit 100 of FIG. 2 has the same elements and/or components as the pivotable module unit 100 of FIG. 1. The sensor holding unit 12 of FIG. 2 forms a chamber, in particular, a sensor chamber, in which sensors can be accommodated.

The right-hand pivoting unit 14 can be seen easily in FIG. 2. Each of the two pivoting units 14 of the pivotable module unit 100 has a pivoting lever 13 and a guide lever 11. The sensor holding unit 12 is pivotable about the first pivot axis a by the pivoting lever 13, and movable about the second pivot axis b by the pivoting lever 13 and optionally additionally by the guide lever 11. In particular, the sensor holding unit 12 is pivotable about the second pivot axis b by a pivotable fastening point of the pivoting lever 13 to the attachment element 10. The second pivot axis b is a static axis. The two guide levers 11 of the two pivoting units 14 are pivotably fastened to the attachment elements 10, in particular, in cooperation with the second pivot axis b. The two pivoting levers 13 are likewise pivotably fastened to the attachment elements 10. The fastening point of the individual guide lever 11 and the fastening point of the individual pivoting lever 13 may be aligned straight in the Z direction along the corresponding attachment element 10. Standard parts can be provided to fasten the guide levers 11 and the pivoting levers 13 pivotably to the attachment elements 10.

One of the two latching units 15 can be seen easily in FIG. 2. The latching units 15 in FIG. 2 are likewise arranged in such a way that the two pivoting units 14 are releasably fastened to the attachment element 10 in the first latching position. The sensor holding unit 12 is at least partly releasably fastened to the pivoting units 14, in particular, to the pivoting lever 13, in the second latching position. To implement a releasable fastening of the sensor holding unit 12 and/or the pivoting unit 14, each of the two latching units 15 can have a first latching device 22 and a second latching device 24.

The first latching device 22 can be used to fasten the corresponding pivoting unit 14 and the corresponding pivoting lever 13 to the corresponding attachment element 10. The first latching device 22 can have an elastic component, which can be clamped or latched into an opening of the corresponding attachment element 10. The elasticity or the flexibility of the elastic component can be adjusted, depending on a minimum impact. If an impact F is exerted directly or indirectly against the sensor holding unit 12, then the impact F is absorbed by the sensor holding unit 12 and transmitted to the pivoting units 14. If the impact F exceeds a minimum impact, the respective first latching device 22 will be released, so as to release the corresponding pivoting unit 14 and the corresponding pivoting lever 13 from the corresponding attachment element 10 (cf. FIG. 5).

It should be noted that releasing the first latching device 22 can additionally or alternatively depend on the contact point or the impact point of an impact F. If the impact F is exerted on the sensor holding unit 12 in such a way that only pivoting about the first pivot axis a is necessary to transmit the impact F, the first latching device 22 can continue to be clamped or latched in, and the sensor holding unit 12 can nevertheless pivot about the first pivot axis a. As the sensor holding unit 12 pivots about only the first pivot axis a, the two guide elements 20 of the sensor holding unit 12 can be guided by the main guide receptacle 26 of the guide levers 11.

The second latching device 24 can be used to fasten the corresponding pivoting unit 14 and the corresponding pivoting lever 13 to the sensor holding unit 12. The second latching device 24 can have an elastic component, which can be clamped or latch on a hook or a projection of the corresponding latching unit 15 or rest on the same. The elastic component of the second latching device 24 can be part of the sensor holding unit 12, in particular, of a connecting frame 32 of the sensor holding unit 12 (cf. FIG. 3). The hook or the projection of the second latching device 24 can be part of the corresponding latching unit. The second latching device 24 can be adjusted in such a way that the sensor holding unit 12 is released from the pivoting units 14 by the pivoting lever 13 when an impact F which is greater than a minimum impact is exerted against the sensor holding unit 12. It should be noted that the second latching device 24 is released when it is necessary to pivot the sensor holding unit 12 about the first pivot axis a to transmit and/or dampen the impact F on the pivoting units 14. If the second latching device 24 is not triggered, the sensor holding unit 12 can be in the second latching position. If the first latching device 22 is not triggered, the pivoting unit 14 can be in the first latching position.

The two pivoting levers 13 are connected to the attachment element 10 in such a way that the first pivot axis a, which is defined by the pivoting lever 13, is movable about the second pivot axis b. The guide lever 11 can additionally be fastened to the attachment element 10 in such a way that during pivoting of the pivoting lever 13 about the second pivot axis b, the guide lever 11 can pivot together with it and/or predefine an angular range of the pivoting about the second axis. The first pivot axis a is therefore intrinsically pivotable and does not represent a static pivot axis. The sensor holding unit 12, together with the first pivot axis a, can therefore move translationally and/or pivotably about the second pivot axis b (cf. FIG. 5). The sensor holding unit 12 can be fastened to the first pivot axis a. For this purpose, two fastening interfaces 21 are provided, which are configured to removably fasten the sensor holding unit 12 to the pivoting units 14, in particular, to the pivoting levers 13. For this purpose, the two guide levers 11 each have a guide receptacle 25. The fastening interfaces 21 thus each extend through the guide receptacles 25 of the two guide levers 11 and can move along the guide receptacle 25. This is particularly beneficial for a translational movement of the sensor holding unit 12. A respective first spring 16 is arranged around each of the two fastening interfaces 21. The first spring 16 may be respectively arranged between the pivoting lever 13 and the sensor holding unit 12. The first spring 16 can be a return spring. Such a first spring 16 can additionally ensure that the movement of the sensor holding unit 12 can be carried out reversibly.

Figure 3:
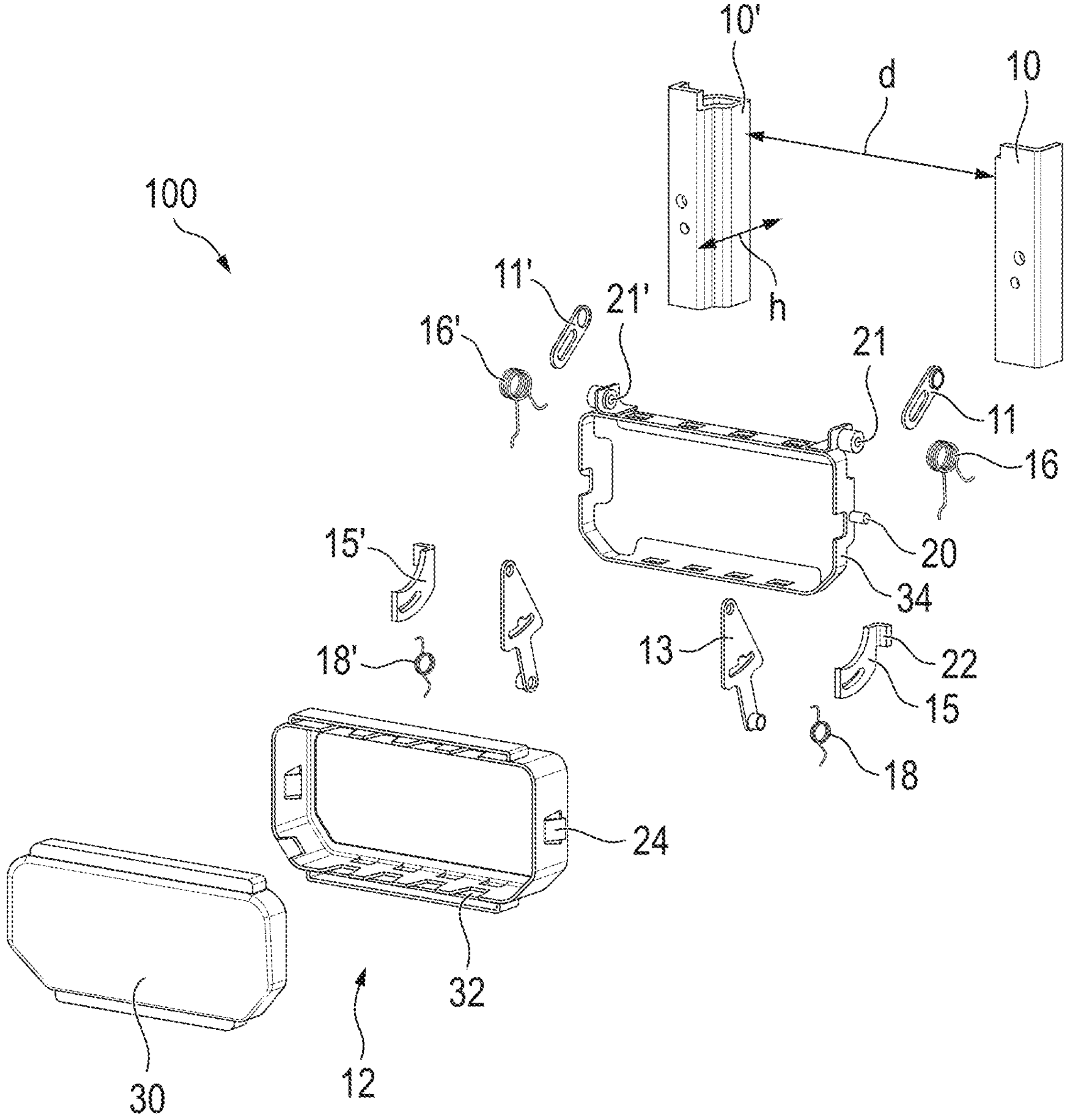
FIG. 3 schematically shows an exploded view of a disclosed pivotable module unit according to an exemplary embodiment.

FIG. 3 shows, schematically, an exploded view of a pivotable module unit 100 according to an exemplary embodiment. If not otherwise described, the pivotable module unit 100 of FIG. 3 has the same elements and/or components as the pivotable module units 100 of FIGS. 1 and 2. The sensor holding unit 12 of FIG. 3 is formed in three parts. The sensor holding unit 12 has a covering 30, a connecting frame 32 and a pivoting frame 34. The covering 30, the connecting frame 32 and the pivoting frame 34 can be releasably coupled to one another. Clip devices can be provided to couple the covering 32 to the connecting frame 32. Clip devices can likewise be provided to couple the connecting frame 32 to the pivoting frame 34. All three elements can form a chamber or a space for sensors.

The two pivoting levers 13 of the two pivoting units 14 can each have a fastening element for fastening the corresponding pivoting lever 13 to the attachment element 10. The fastening element can be cylindrical. In each case, a second spring 18 can be arranged around the corresponding fastening element.

Figure 4:
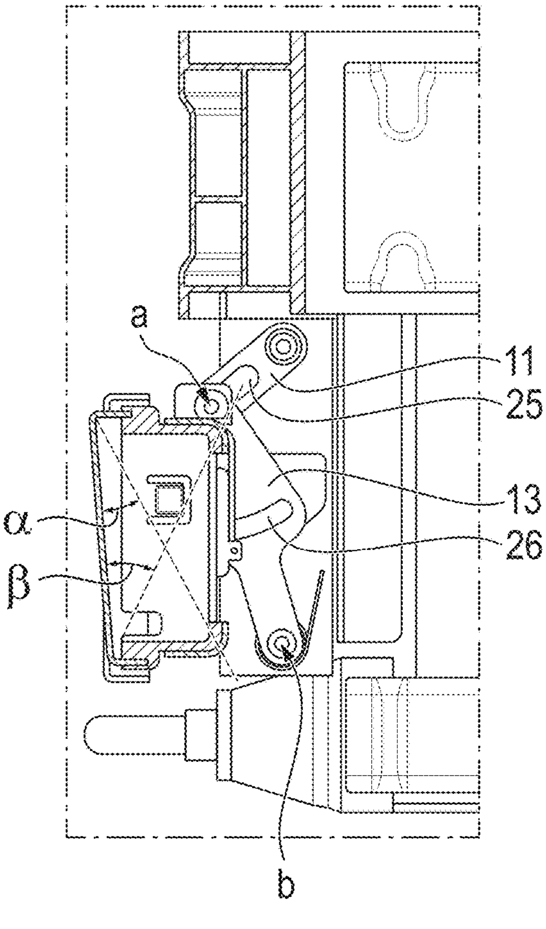
FIGS. 4 and 5 schematically show sectional views of a disclosed pivotable module unit according to an exemplary embodiment.
Figure 5:
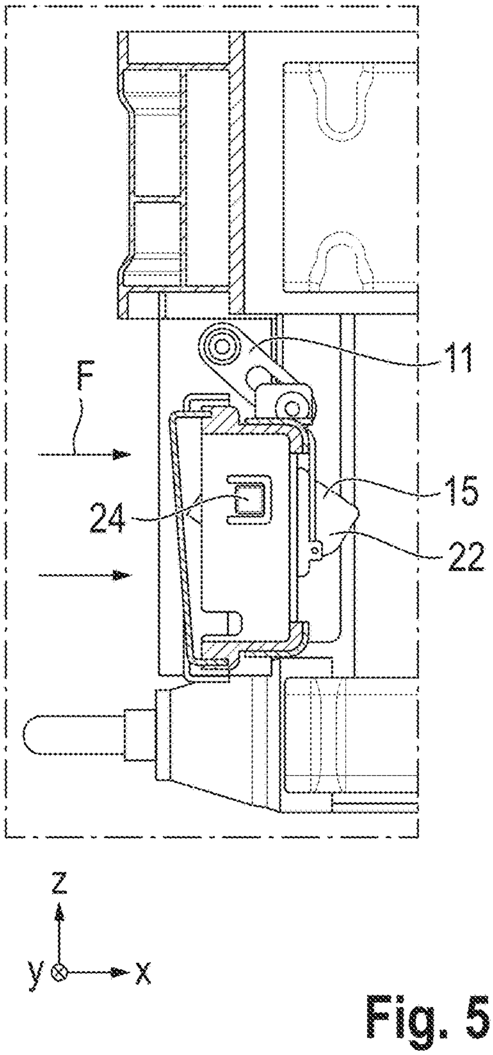

FIGS. 4 and 5 show, schematically, sectional views of a pivotable module unit 100 according to an exemplary embodiment. If not otherwise described, the pivotable module unit 100 of FIGS. 4 and 5 has the same elements and/or components as the pivotable module units 100 of FIGS. 1 to 3. In FIG. 4, the sectional view is shown in such a way that only the left-hand pivoting unit 14 is illustrated. The section of the sectional views corresponds to the axis of symmetry S (cf. FIG. 1 and FIG. 6). In FIG. 4, the pivotable module unit 100 is in a rest position. The sensor holding unit 12 can be configured to absorb an impact F. Depending on the impact location, the direction of the force and/or the magnitude of the force of the impact F, the sensor holding unit 12 can move differently. As a result of such a pivotable module unit 100, the sensor holding unit 12 has a plurality of degrees of freedom and can pivot about different axes, so that a translational movement is also made possible. The sensor holding unit 12 can pivot by a first pivot angle α, the sensor holding unit 12 being able pivot about the first pivot axis a for this purpose. The sensor holding unit 12 can also pivot by a second pivot angle β, the sensor holding unit 12 and the two pivoting levers 13 being able to pivot about the second pivot axis b for this purpose.

If an impact F is exerted on the sensor holding unit 12 substantially centrally in relation to the height, i.e., in relation to the Z direction, in particular, on the covering 30 of the sensor holding unit 12, then the pivoting units 14 can be used in such a way that pivoting about the first pivot axis a and about the second pivot axis b is triggered. The impact F can therefore be transmitted from the sensor holding unit 12 to the pivoting units 14 in such a way that the pivoting units 14 permit a translational movement of the sensor holder to dampen the impact F. In FIG. 5, the sensor holding unit 12 has accordingly been displaced in the direction of the interior of the transportation vehicle, i.e., in the X direction. For this purpose, the latching units 15 have been released from the first latching position and from the second latching position. In FIG. 5, it is possible to see that the first latching device 22 has been triggered. The movement performed by the sensor holding unit 12 from FIG. 4 to FIG. 5 is generally reversible. Inasmuch as no impact F is exerted on the sensor holding unit 12, the sensor holding unit 12 assumes its rest position again within an extremely short time (depending on the springing or elastic properties of the pivoting units 14).

Figure 6:
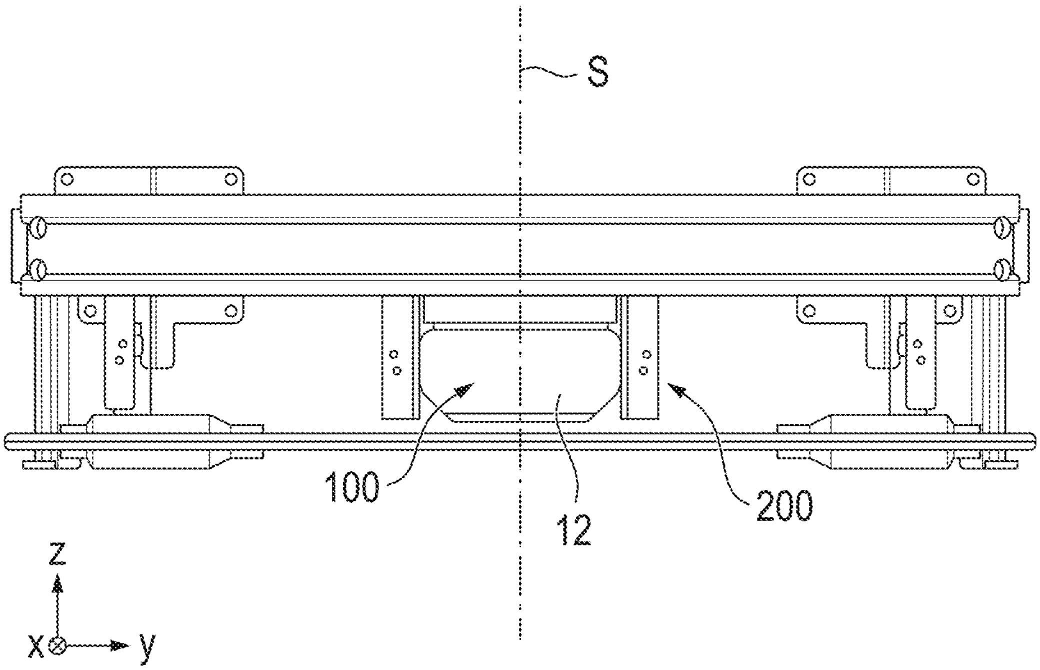
FIG. 6 schematically shows a disclosed pivotable sensor system according to an exemplary embodiment.

FIG. 6 shows, schematically, a pivotable sensor system 200 according to an exemplary embodiment. The pivotable sensor system 200 of FIG. 6 has a pivotable module unit 100, such as a pivotable module unit 100 of FIGS. 1 to 5. The two attachment elements 10 of the pivotable module unit 100 are connected to a vehicle component, in particular, only at the top (in relation to the Z direction). The vehicle part can be a front module or a rear module. Alternatively, it can be a side module of the transportation vehicle. The sensor system 200 additionally has at least one sensor. This can be a radar sensor, an ultrasonic sensor and/or a camera system.

In addition, it should be pointed out that the terms "comprising" and "having" do not rule out other elements, and the indefinite articles "a" or "one" do not rule out a multiplicity. Furthermore, it should be pointed out that features and operations which have been described with reference to one of the above exemplary embodiments can also be used in combination with other features and operations of other exemplary embodiments described above. Designations in the claims are not to be viewed as restrictions.

LIST OF DESIGNATIONS

100 Pivotable module unit
200 Pivotable sensor system
10 Attachment element
11 Guide lever
12 Sensor holding unit
13 Pivoting lever
14 Pivoting unit
15 Latching unit
16 First spring
18 Second spring
20 Guide element
21 Fastening interface
22 First latching device
24 Second latching device
25 Guide receptacle
26 Main guide receptacle
30 Covering
32 Connecting frame
34 Pivoting frame
a First pivot axis
b Second pivot axis
α First pivot angle
β Second pivot angle
F Impact
S Axis of symmetry

The invention claimed is:

1. A pivotable module for transportation vehicle sensors, the pivotable module comprising:
at least two attachment elements spaced apart from each other;
a sensor holding unit arranged between the two attachment elements; and
two pivoting units,
wherein the sensor holding unit holds at least one sensor for a transportation vehicle,
wherein the two pivoting units fasten the sensor holding unit to the two attachment elements so the sensor holding unit is movable about a first pivot axis and is movable about a second pivot axis, which is different from the first pivot axis, and
wherein at least one of the two pivoting units is spring-loaded.

2. The pivotable module of claim 1, wherein:
two latching units are provided, which are each fastened to a pivoting unit, and
the latching units fasten:
the two pivoting units releasably to the corresponding attachment element in a first latching position, and/or
the sensor holding unit at least partly releasably to the pivoting units in a second latching position.

3. The pivotable module of claim 1, wherein each of the two pivoting units has a pivoting lever and a guide lever,
wherein each of the guide levers has a guide receptacle that operatively connects the guide lever to the pivoting lever,
wherein the sensor holding unit is movable about the first pivot axis by movement of the respective pivoting lever, and
wherein the sensor holding unit is movable about the second pivot axis by movement of the respective pivoting lever and the movement of the guide lever.

4. The pivotable module of claim 1, wherein:
the first pivot axis is movable about the second pivot axis, and/or
the sensor holding unit is movable about the second pivot axis, and/or
the sensor holding unit, together with the first pivot axis, is translationally and/or pivotably movable about the second pivot axis.

5. The pivotable module of claim 1, wherein:
the sensor holding unit has two guide elements, and the two pivoting units each have a main guide receptacle, and
the two guide elements are arranged so that each of the two guide elements extends at least partly into the main guide receptacle so that pivoting of the sensor holding unit about the first pivot axis is guided.

6. The pivotable module of claim 1, wherein the sensor holding unit has a substantially flat covering.

7. The pivotable module of claim 1, wherein the sensor holding unit comprises at least two fastening interfaces configured to fasten the sensor holding unit to the pivoting units, wherein the two fastening interfaces are further configured to accommodate a respective first spring.

8. A pivotable sensor system comprising:
at least one sensor for a transportation vehicle; and
a pivotable module including at least two attachment elements spaced apart from each other, a sensor holding unit arranged between the two attachment elements, and two pivoting units, wherein the sensor holding unit holds the at least one sensor for the transportation vehicle, wherein the two pivoting units fasten the sensor holding unit to the two attachment elements so the sensor holding unit is movable about a first pivot axis and is movable about a second pivot axis, which is different from the first pivot axis, and
wherein at least one of the two pivoting units is spring-loaded.

9. A transportation vehicle comprising the at least one pivotable sensor system of claim 8.

10. The transportation vehicle of claim 9, wherein the sensor holding unit of the pivotable module of the pivotable sensor system is displaceable toward the interior of the transportation vehicle by up to 70 mm.

11. The transportation vehicle of claim 9, wherein:
two latching units are provided, which are each fastened to a pivoting unit, and
the latching units fasten:
the two pivoting units releasably to the corresponding attachment element in a first latching position, and/or
the sensor holding unit at least partly releasably to the pivoting units in a second latching position.

12. The transportation vehicle of claim 9, wherein each of the two pivoting units has a pivoting lever and a guide lever,
wherein each of the guide levers has a guide receptacle that operatively connects the guide lever to the pivoting lever, wherein the sensor holding unit is movable about the first pivot axis by movement of the respective pivoting lever, and wherein the sensor holding unit is movable about the second pivot axis by movement of the respective pivoting lever and the movement of the guide lever.

13. The transportation vehicle of claim 9, wherein:

the first pivot axis is movable about the second pivot axis, and/or the sensor holding unit is movable about the second pivot axis, and/or the sensor holding unit, together with the first pivot axis, is translationally and/or pivotably movable about the second pivot axis.

14. The transportation vehicle of claim 9, wherein:

the sensor holding unit has two guide elements, and the two pivoting units each have a main guide receptacle, and the two guide elements are arranged so that each of the two guide elements extends at least partly into the main guide receptacle so that pivoting of the sensor holding unit about the first pivot axis is guided.

15. The transportation vehicle of claim 9, wherein the sensor holding unit has a substantially flat covering.

16. The transportation vehicle of claim 9, wherein the sensor holding unit comprises at least two fastening interfaces configured to fasten the sensor holding unit to the pivoting units, wherein the two fastening interfaces are further configured to accommodate a respective first spring.

* * * * *